(12) United States Patent
Desclos et al.

(10) Patent No.: US 9,590,703 B2
(45) Date of Patent: *Mar. 7, 2017

(54) MODAL COGNITIVE DIVERSITY FOR MOBILE COMMUNICATION SYSTEMS

(71) Applicant: ETHERTRONICS, INC., San Diego, CA (US)

(72) Inventors: Laurent Desclos, San Diego, CA (US); Sebastian Rowson, San Diego, CA (US); Jeffrey Shamblin, San Marcos, CA (US); Olivier Pajona, San Diego, CA (US)

(73) Assignee: ETHERTRONICS, INC., San Diego, CA (US)

( * ) Notice: Subject to any disclaimer, the term of this patent is extended or adjusted under 35 U.S.C. 154(b) by 397 days.

This patent is subject to a terminal disclaimer.

(21) Appl. No.: 13/707,506

(22) Filed: Dec. 6, 2012

(65) Prior Publication Data

US 2014/0162566 A1 Jun. 12, 2014
US 2016/0211894 A9 Jul. 21, 2016

Related U.S. Application Data

(63) Continuation of application No. 13/029,564, filed on Feb. 17, 2011, now Pat. No. 8,362,962, and a continuation-in-part of application No. 13/548,895, filed on Jul. 13, 2012, now Pat. No. 8,633,863, said application No. 13/029,564 is a continuation of application No. 12/043,090, filed on Mar. 5, 2008, now Pat. No. 7,911,402.

(51) Int. Cl.
| | |
|---|---|
| *H04B 17/00* | (2015.01) |
| *H04B 7/04* | (2006.01) |
| *H04B 7/08* | (2006.01) |
| *H04B 7/10* | (2006.01) |

(52) U.S. Cl.
CPC ......... *H04B 7/0404* (2013.01); *H04B 7/0871* (2013.01); *H04B 7/0802* (2013.01); *H04B 7/0848* (2013.01); *H04B 7/10* (2013.01)

(58) Field of Classification Search
CPC .. H04B 7/0825; H04B 7/0404; H04B 7/0871; H01Q 3/44
USPC ........................................... 455/67.13, 67.11
See application file for complete search history.

(56) References Cited

U.S. PATENT DOCUMENTS

| | | | |
|---|---|---|---|
| 8,320,849 B2 * | 11/2012 | Nogami et al. | ............... 455/101 |
| 8,581,789 B2 * | 11/2013 | Desclos | .................. H01Q 1/50 |
| | | | 343/702 |
| 9,231,669 B2 * | 1/2016 | Desclos | ................. H01Q 1/243 |
| 2013/0040651 A1 * | 2/2013 | Derneryd et al. | ......... 455/452.1 |

* cited by examiner

Primary Examiner — Eugene Yun
(74) Attorney, Agent, or Firm — Coastal Patent Law Group, P.C.

(57) ABSTRACT

A system and method for antenna diversity in a communication system are provided, the system including multiple antennas, including at least one modal antenna, wherein each of the at least one modal antenna has multiple modes corresponding to multiple radiation patterns, and a processor coupled to the multiple antennas and configured to select a mode among the multiple modes to optimize signal quality for each time interval based on a CQI.

21 Claims, 9 Drawing Sheets

| Use Condition | Mode | TRP | TIS | ρ | θ | ... |
|---|---|---|---|---|---|---|
| 1 | 1 | trp11 | tis11 | ρ11[1:N] | θ11[1:N] | ..... |
| 1 | 2 | trp12 | tis12 | ρ12[1:N] | θ12[1:N] | ..... |
| 1 | 3 | trp13 | tis13 | ρ13[1:N] | θ13[1:N] | ..... |
| 1 | 4 | trp14 | tis14 | ρ14[1:N] | θ14[1:N] | ..... |
| 2 | 1 | trp21 | tis21 | ρ11[1:N] | θ11[1:N] | ..... |
| 2 | 2 | trp22 | tis22 | ρ22[1:N] | θ22[1:N] | ..... |
| 2 | 3 | trp23 | tis23 | ρ23[1:N] | θ23[1:N] | ..... |
| 2 | 4 | trp24 | tis24 | ρ24[1:N] | θ24[1:N] | ..... |
| ..... | ..... | ..... | ..... | ..... | ..... | ..... |

FIG. 6

MODAL COGNITIVE DIVERSITY FOR MOBILE COMMUNICATION SYSTEMS

CROSS REFERENCE

This application is a CIP of U.S. Ser. No. 13/029,564, filed Feb. 17, 2011, and titled "ANTENNA AND METHOD FOR STEERING ANTENNA BEAM DIRECTION", which is a CON of U.S. Ser. No. 12/043,090, filed Mar. 5, 2008, titled "ANTENNA AND METHOD FOR STEERING ANTENNA BEAM DIRECTION", now issued as U.S. Pat. No. 7,911,402; and a CIP of U.S. Ser. No. 13/548,895, filed Jul. 13, 2012, titled "MODAL ADAPTIVE ANTENNA USING PILOT SIGNAL IN CDMA MOBILE COMMUNICATION SYSTEM AND RELATED SIGNAL RECEIVING METHOD", the contents of each of which are hereby incorporated by reference.

BACKGROUND OF THE INVENTION

As new generations of handsets and other wireless communication devices become smaller and embedded with increased applications, new antenna designs, system configurations and controlling algorithms are required to enable new capabilities and to improve QOS.

Antenna diversity schemes are used to improve the quality and reliability of a wireless communication link. In many instances, the line of sight between a transmitter and a receiver becomes blocked or shadowed with obstacles such as walls and other objects. Each signal bounce may introduce phase shifts, time delays, attenuations and distortions, which ultimately interfere at the receiving antenna. Destructive interference in the wireless link is problematic and results in degradation of device performance. A signal quality metric is often used to assess the quality of signals. Examples of such quality metrics include signal-to-noise ratio (SNR), signal to interference-plus-noise ratio (SINR), receive signal strength indicator (RSSI), bit error rate (BER) and other metrics, which are called channel quality indicators (CQI). An antenna diversity scheme can mitigate interference from multipath environments by monitoring one or more CQIs. Antenna diversity can be implemented generally in several forms, including spatial diversity, pattern diversity and polarization diversity, for example.

Spatial diversity for reception includes multiple antennas having similar characteristics, which are physically spaced apart from one another. In multipath propagation conditions, as encountered with a blocked or shadowed line of sight path, each of the multiple receive antennas experiences a different fading characteristic. Accordingly, where a first antenna experiences a significant reduction in signal reception, the second antenna is likely to receive an effective signal. Collectively, the spatial diversity scheme can provide a robust link. Spatial diversity for transmission is also effective, although link improvements may be needed in certain cases for the receive side of the base station.

Pattern diversity generally includes two or more co-located antennas with distinct radiation patterns. This technique utilizes antennas that generate directive beams and are usually separated by a short distance. Collectively, these co-located antennas are capable of discriminating a large portion of angle space and may additionally provide relatively higher gain compared to an omnidirectional antenna.

Polarization diversity generally includes paired antennas with orthogonal polarizations. Reflected signals can undergo polarization changes depending on the medium through which they are traveling. By pairing two complimentary polarizations, this scheme can immunize a system from polarization mismatches that would otherwise cause signal fade.

Each of the above diversity schemes requires one or more processing techniques to effectuate antenna diversity, such as switching, selecting and combining. Switching is one of the simple and efficient processing techniques and generally includes receiving a signal from a first antenna until the signal level fades below a threshold level, at which point active components such as switches engages the second antenna for communication with the receiver. Selecting is a processing technique that determines an optimal signal for utilization by the receiver during each predetermined time interval. Both selecting and switching techniques may utilize active components, such as switches, to select the optimal signal based on one or more CQIs. The selecting and switching techniques may be collectively called a switching technique wherein the selection of the signal for utilization is carried out by controlling the switches or other active components coupled to the antennas.

Combining is a processing technique wherein the multiple signals are weighted and combined into a signal for communication with the receiver. The weights are adjusted such that a main lobe of a receiving beam pattern is toward the desired direction and a null of the receiving beam pattern is toward the interference direction. Examples of combining techniques include a minimum mean squared error (MMSE) combining technique, a maximum ratio combining (MRC) technique and an equal gain combining (EGC) technique. An exemplary algorithm to carry out each of these combining techniques may be briefly summarized as follows. In the MMSE technique, the signals in paths are weighted where the weights are chosen to provide a minimum mean square error between the combined voltage stream and the signal. In the MRC technique, the signals in paths are weighted where the weights are chosen to be proportional to the respective signal amplitudes to maximize the output SNR. The weighted signals are then multiplied by respective phase factors prior to summing so that the signals are added in phase to maximize the gain. The EGC technique is a simplified version of the MRC technique, wherein the signals are weighted with the same factor and then multiplied by the phase factors.

Although the above techniques have been described for reception, their analogs are possible for transmit functions. Receive (Rx) diversity refers to configurations where a diversity scheme is applied for signal reception; and transmit (Tx) diversity refers to configurations where a diversity scheme is applied for signal transmission

BRIEF DESCRIPTION OF THE DRAWINGS

FIG. 2(*b*) illustrates a radiation pattern associated with the modal antenna of FIG. 1 in the second state.

FIG. 6 illustrates an example of the lookup table (LUT) for the case a four-mode modal antenna.

DETAILED DESCRIPTION OF THE PREFERRED EMBODIMENTS

In Rx diversity for a conventional wireless mobile device, a main antenna is typically used to cover the transmit and receive bands. One or more diversity antennas are added in the device to cover the receive band and to counteract the effect of propagation and multipath fading, thus requiring additional receive chains. The diversity functions may be effectuated by means of the switching technique described earlier to switch the receive path from one antenna to the other to improve the signal quality during a given time interval according to a decision based on SNR or other CQI parameters. Another scheme involves the combining technique described earlier to constructively combine signals for enhancing overall signal quality based on SNR or other CQI parameters. In a conventional spatial or pattern diversity architecture with multiple antennas, size constraints may become significant and coupling among the antennas as well as between the antennas and nearby electronics of a communication device may deteriorate transmission and reception qualities. Additionally, efficiency may deteriorate in many instances where multiple paths are energized and power consumption increases. Implementing two, three or more diversity antennas may provide system flexibility, but the volume and area requirements become increasingly severe as additional antennas, associated components and transmission lines are needed.

A modal antenna, also referred to as a null-steering antenna, can generate multiple modes corresponding to multiple radiation patterns, equivalent to having a set of antennas with the same feed. By using the modal antenna capable of generating different radiation patterns, it is possible to exploit a priori knowledge of antenna nulls and lobes in the different modes for steering the beam to have nulls in dominant interference directions while keeping gain in desired directions. Accordingly, implementation of a modal antenna may allow for pattern and polarization diversity with one antenna, thereby requiring less volume and area than using multiple antennas for diversity. Further, the use of a modal antenna in Rx diversity requires less number of receiver chains than using multiple antennas. This document describes antenna diversity using one or more modal antennas and a method to dynamically find an optimal mode of the modal antenna for signal processing based on predicted CQI values. Examples of structures and implementations of the modal antennas are provided in U.S. Pat. No. 7,911,402, entitled "ANTENNA AND METHOD FOR STEERING ANTENNA BEAM DIRECTION," issued on Mar. 22, 2011. The contents of the above patent are incorporated herein by reference and are summarized as follows.

Figure 1:
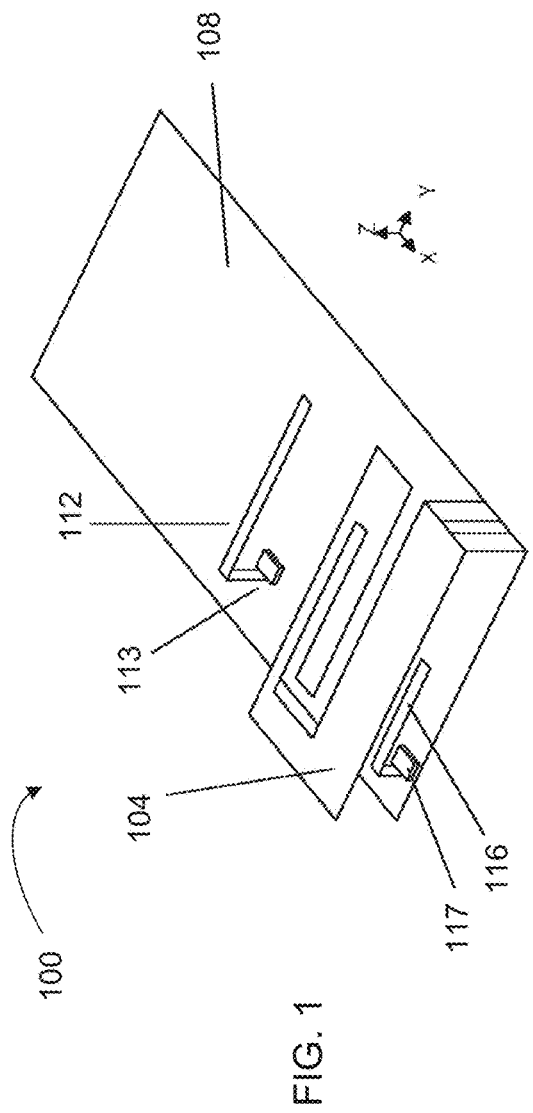
FIG. 1 illustrates an example of a modal antenna.
Figure 2B:
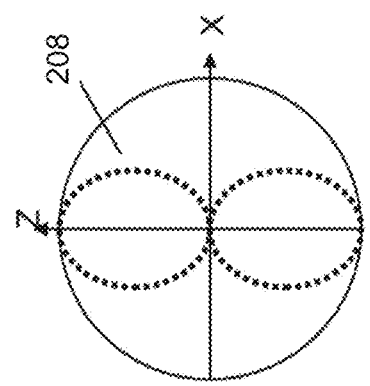
FIG. 2(*a*) illustrates a radiation pattern associated with the modal antenna of FIG. 1 in the first state.
Figure 2A:
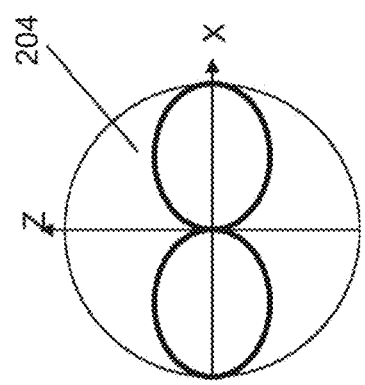

FIG. 1 illustrates an example of a modal antenna 100, which includes an Isolated Magnetic Dipole™ (IMD) element 104 placed on a ground plane 108, a first parasitic element 112 coupled to an first active element 113, and a second parasitic element 116 coupled to a second active element 117. The active elements 113 and 117 may include switches that either electrically connect (short) or disconnect (open) the parasitic elements 112 and 116 to the ground plane 108. This structure allows for two different modes of operation with a common frequency corresponding to a first state where the parasitic elements 112 and 116 are shorted to the ground and a second state where the parasitic elements 112 and 116 are open. FIG. 2($a$) illustrates a radiation pattern 204 associated with the antenna 100 in the first state; and FIG. 2($b$) illustrates a radiation pattern 208 in the second state, which shows a ninety-degree shift in direction as compared to the radiation pattern 204. Thus, by controlling the active elements 113 and 117 of the modal antenna 100, the operation of two modes can be obtained at the same frequency. The control scheme can be extended for three or more multi-mode operations by incorporating, for example, tunable elements in the active elements for variable control and additional active elements for matching. Examples of these active elements include switches, tunable capacitors, tunable phase shifters, diodes, micro-electro-mechanical system (MEMS) switches, MEMS tunable capacitors, and transistors including a metal oxide semiconductor field effect transistor (MOSFET), a metal semiconductor field effect transistor (MESFET), a pseudomorphic high electron mobility transistor (pHEMT), a heterojunction bipolar transistor (HBT) or of other suitable technologies.

Figure 3:
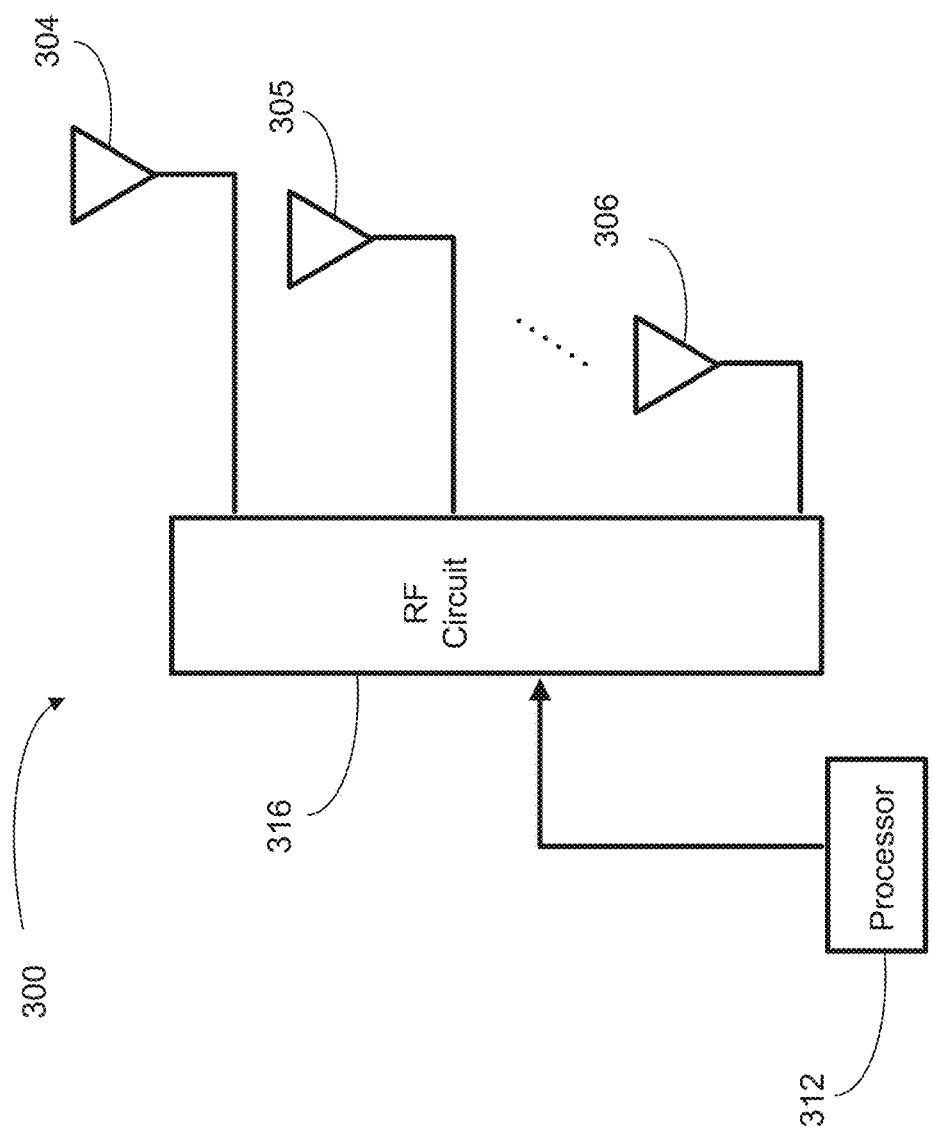
FIG. 3 illustrates an example of a communication system including multiple antennas, wherein at least one of the multiple antennas is a modal antenna and the others are conventional non-modal antennas; or all the multiple antennas are modal antennas.

FIG. 3 illustrates an example of a communication system 300 including multiple antennas 304, 305 . . . and 306, a processor 312 and a radio frequency (RF) circuit 316, wherein at least one of the multiple antennas 304, 305 . . . and 306 is a modal antenna and the others are conventional non-modal antennas; or all the multiple antennas 304, 305 . . . and 306 are modal antennas. The antenna configuration in FIG. 3 may be used for spatial, pattern and/or polarization diversity. Rx diversity can be implemented by configuring two or more of the multiple antennas 304, 305 . . . and 306 for reception; Tx diversity can be implemented by configuring two or more of the multiple antennas 304, 305 . . . and 306 for transmission. Tx and Rx diversities can be collocated in the system, by configuring two or more antennas for transmission and other two or more antennas for reception. The multiple antennas 304, 305 . . . and 306 are coupled to the processor 312 through the RF circuit 316. The RF circuit includes various modules and components for processing signals, such as a transceiver, filters, duplexers, switches, power amplifiers, matching networks and so on. The processor 312 may be included in a baseband, a CPU or an application CPU, or associated with the transceiver or the antennas. The processor 312 may be configured to store data, specifications and other prerequisites as well as to perform algorithms to control the antennas and other components and modules for signal processing.

Figure 4:
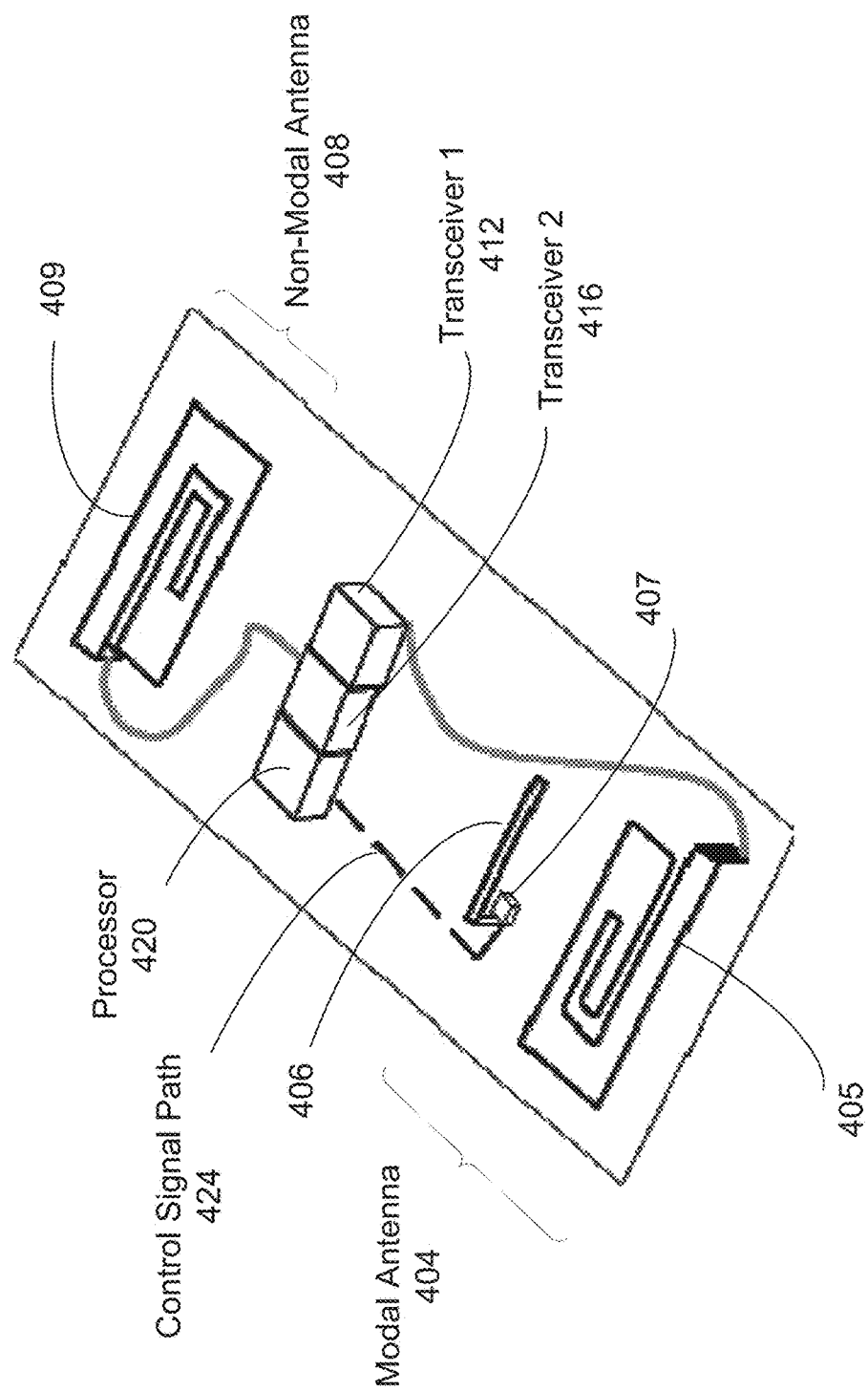
FIG. 4 illustrates an example of a hardware configuration of an antenna system having one modal antenna and one conventional non-modal antenna.

FIG. 4 illustrates an example of a hardware configuration of an antenna system having one modal antenna 404 and one conventional non-modal antenna 408. The modal antenna 404 is located at one edge of the board, having an IMD 405, a parasitic element 406 and an active element 407 coupled to the parasitic element 406. The non-modal antenna 408 is located at the other edge of the board, having a main radiator 409. In this example, the modal antenna 404 is coupled to a transceiver 1 412, and the non-modal antenna 408 is coupled to a transceiver 2 416, for processing Tx or Rx signals. A processor 420 is coupled to the transceiver 1 412 and the transceiver 2 416 for controlling signals and performing algorithms for diversity and other functions. Furthermore, in this example, the processor 420 is directly coupled to the active element 407 to configure the parasitic element 407 to generate multiple modes associated with the modal antenna 404 by the switching control, and the control signal path 424 is indicated by the dashed line in this figure.

Figure 5:
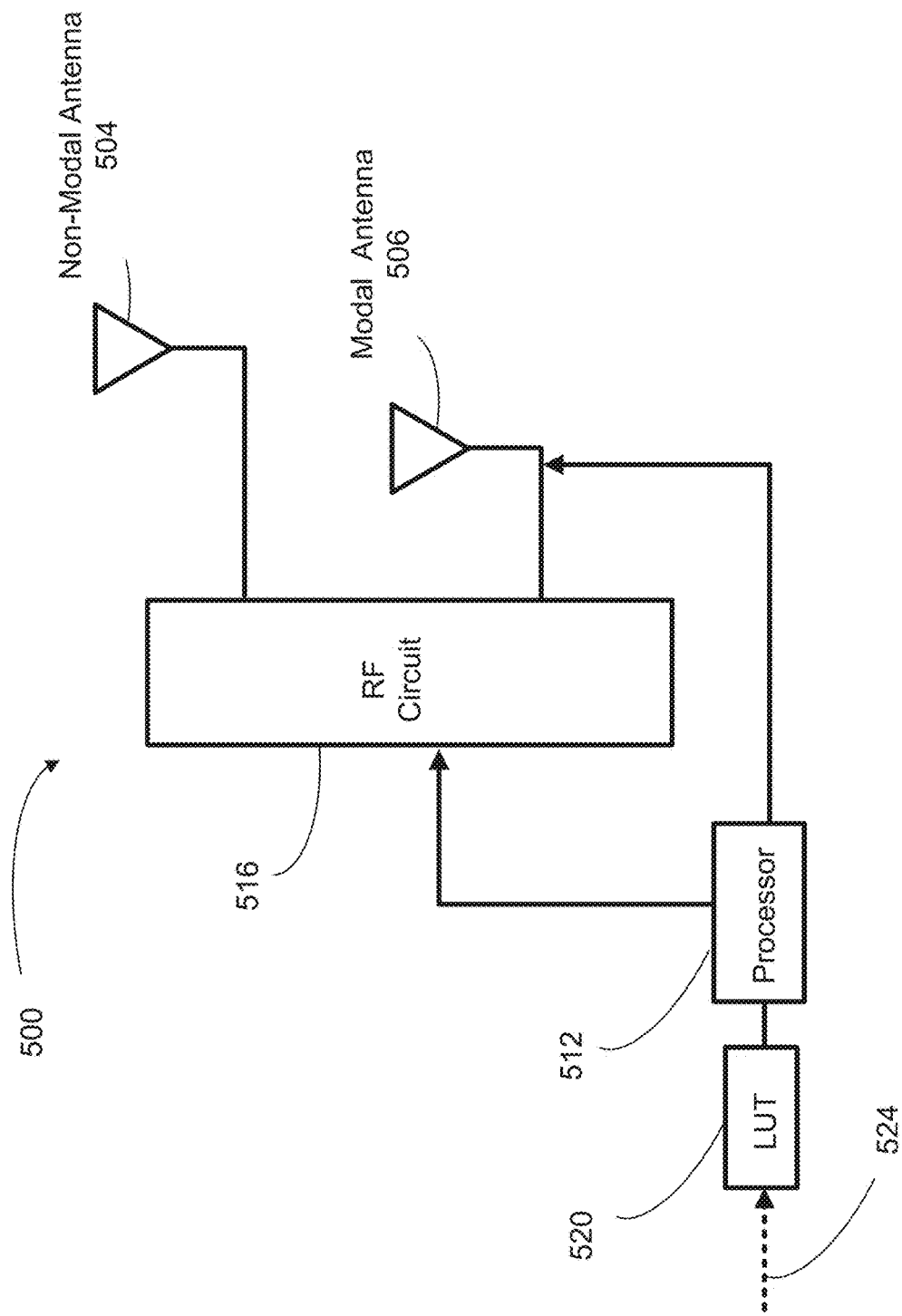
FIG. 5 illustrates an example of a communication system including a conventional non-modal antenna and a modal antenna.

FIG. 5 illustrates an example of a communication system 500 including a conventional non-modal antenna 504, a modal antenna 506, a processor 512 and a radio frequency (RF) circuit 516. This configuration represents a simple case of the multi-antenna system shown in FIG. 3, having only two antennas, one of which is a modal antenna. A look-up table (LUT) 520 may be added to provide input information for the processor 512. The LUT 520 may contain measured data and be stored in a memory in the processor 512 or in a different location coupled to the processor 512. The antenna configuration in FIG. 5 may be used for spatial, pattern and/or polarization diversity. Either Rx diversity or Tx diversity may be implemented by configuring two antennas 504 and 506 for reception or transmission. The antennas 504 and 506 are coupled to the processor 512 through the RF circuit 516. The RF circuit 516 includes various modules and components for processing signals, such as a transceiver, filters, duplexers, switches, power amplifiers, matching networks and so on. The processor 512 may be included in a baseband, a CPU or an application CPU, or associated with the transceiver or the antennas. The processor 512 may be configured to store data, specifications and other prerequisites as well as to perform algorithms to control the antennas and other components and modules for signal processing. In the example in FIG. 5, the modal antenna 506 is controlled by the processor, as in the hardware configuration example of FIG. 4, the processor controlling the on/off of the active elements to configure the parasitic elements to generate multiple modes corresponding to multiple radiation patterns. Such a modal antenna tuning means may be included in the processor 512 as in FIG. 5, coupled with the modal antenna 506 to form a "plug-and-play" modal antenna system, or separated as a modal antenna tuning module.

The LUT 520 may include characterization data of the modal antenna 506, such as total radiated power (TRP), total isotropic sensitivity (TIS), radiation patterns and so on, which can be measured in advance for various use conditions. The radiation pattern may be stored with the $(\rho,\theta)$ coordinate having N points (300-500 points, for example). The use conditions may include positioning of a head and/or a hand of a user including the possible distances and angles with respect to the handset. FIG. 6 illustrates an example of the LUT 520 for the case a four-mode modal antenna. Under each use condition, each mode is listed along with the characterization data.

During operation, the use condition may be detected by one or more sensors such as a proximity sensor, a motion sensor, a light sensor, a pressure sensor or other types of sensors. Information on the use condition may be inputted to the LUT 520 as indicated by dashed line 524. Based on the information and the corresponding characterization data of each mode of the modal antenna 506, two or more modes that are likely to provide optimal signal properties can be chosen under the use condition. The use condition varies with time, and thus the processor 512 may be configured to perform the mode-selection procedure dynamically based on a predetermined time interval and/or a change threshold.

Referring back to FIG. 3, where the system includes at least one modal antenna, antenna diversity can be achieved by selecting one of the antennas or one mode out of the multiple modes that the modal antenna provides. Alternatively, the combining technique can be utilized to constructively combine multiple signals from respective chains to enhance the overall signal strength and quality for diversity. In either case, it is necessary first to find a mode that provides the optimal signal quality among the multiple modes of the modal antenna. Furthermore, referring back to FIG. 5, where based on the LUT 520 the processor 512 selects two or more candidate modes that are likely to provide optimal signal properties, it is still necessary to find a mode that provides the optimal signal quality among the candidate modes during operation. The procedure to select such an optimal mode needs to be carried out dynamically since the use conditions, movement of the handset, incoming signal properties, base station conditions and various other conditions and surroundings vary with time. In the following, a method to dynamically find an optimal mode among multiple modes of a modal antenna for diversity processing is described based on a technique involving CQI prediction. The method is thus termed modal cognitive diversity (MCD) in this document.

An example of a CQI prediction algorithm is described by Touheed et al., "Predictive CQI Reporting for HSDPA," IEEE 19th International Symposium, 15-18 Sep. 2008, which is briefly summarized below. A linear predictor based on a normalized-least-mean-square (NLMS) adaptive filter can be used to derive future CQI estimates. In this algorithm, the vector W(n) represents the filter tap weight vector (coefficients of filter) and the vector X(n) represents the filter input vector (CQI values) at time n as follows:

$$W(n)=[W_1(n),W_2(n),\ldots,W_M(n)]^T$$

$$X(n)=[CQI(n-1),CQI(n-2),\ldots,CQI(n-M)]^T.$$

Here $(.)^T$ represents transpose operator, and M represents the filter length. The NLMS adaptation equation gives the coefficients of filter at time n+1 as follows:

$$W(n+1) = W(n) + \mu \frac{X(n)e(n)}{X(n) \cdot X^H(n)}. \quad \text{Eq. (1)}$$

Here μ is the step size parameter, e(n) is the CQI prediction error, and $(.)^H$ represents Hermitian transpose. The future value of CQI, $\overline{CQI}(n+1)$, can be predicted at time n as:

$$\overline{CQI}(n+1)=X(n+1)\cdot W^H(n+1), \quad \text{Eq. (2)}$$

where $$X(n+1)=[CQI(n),CQI(n-1),\ldots,CQI(n+1-M)]^T. \quad \text{Eq. (3)}$$

Thus, the above equation Eq. (2) for $\overline{CQI}(n+1)$ indicates that the CQI value at time n+1 can be predicted based on the coefficients of filter W(n) that depends on the quantities during the filter length M up until time n as shown in Eq. (1) and the CQI values during the filter length M up until time n as shown in Eq. (3).

Pilot signals can be used to measure and calculate CQIs in the CQI prediction algorithm. In cellular and personal communication services (PCS) systems based on code division multiple access (CDMA), for example, a pilot signal is used for synchronization, coherent detection, soft handoff, maintaining orthogonally between base stations and so on. A pilot signal is a carrier modulated by a high chip rate pulse-shaped pseudo noise (PN) sequence and is transmitted on the forward link (from a base station to a mobile unit). All mobile units have the prior knowledge of the periodic PN sequence.

In the present MCD scheme, the CQI prediction algorithm is carried out for each mode of a modal antenna at each time step to determine the expected (predicted) CQI for each mode j, $\overline{CQI}j(n+1)$. Specifically, the filter input vector X(n) contains CQI values which are either previous measurements CQIi(n−k) (when the mode j corresponding to the filter j was selected), or previous predicted CQI values for this mode $\overline{CQI}j(n-k)$ (when the mode j corresponding to the filter j is currently selected). It can also contain a combination of CQIi(n−k) and $\overline{CQI}j(n-k)$ during transition phases which occur when the decision is made to switch from one mode to another mode.

At a given time step n, the instantaneous CQI for the currently selected i-th mode, CQIi(n), is measured and compared to the predicted CQI for the j-th mode, $\overline{CQI}j(n+1)$, and the mode switches to the j-th mode if:

$$CQI_i(n) < \overline{CQI}_j(n+1) - \Delta, \quad \text{Eq. (4a)}$$

where Δ is a predetermined threshold and i≠j. The threshold may be predetermined such that the switch from one mode to another gives a meaningful, good enough CQI improvement. If the expected CQI improvement is less than the threshold, or the other modes provide the predicted CQI values lower than the instantaneous CQI of the i-th mode, the mode stays the same.

The above algorithm can be extended to predict CQI values in the several future steps to be used for the decision making as expressed in the following:

$$CQI_i(n) < f(\overline{CQI}_j(n+1), \ldots, \overline{CQI}_j(n+k)) - \Delta \quad \text{Eq. (4b)}$$

$$CQI_i(n) < f(\overline{CQI}_j(n+1), \ldots, \overline{CQI}_j(n+k)) - \Delta_j(f(j)), \quad \text{Eq. (4c)}$$

where k represents the number of future steps, and f(.) is a function of the predicted CQI values in the future k steps. The function, f, may represent an operation of taking an average, selecting the best or worst predicted CQI value among the k-number predicted CQI values, obtaining an extrapolated CQI value, or other suitable operations. The above extended process may be referred to as post filtering process.

Specifically, Eq. (4a) is extended as Eq. (4b) so that the measured CQIi(n) is not only compared to $\overline{CQI}j(n+1)$ as in Eq. (4a), but to the result of taking into account several predictions forward, ($\overline{CQI}j(n+1) \ldots \overline{CQI}j(n+k)$). Eq. (4b) is modified as Eq. (4c), where the Δ threshold value is no longer fixed but can vary over time by taking into account various parameters for each filter corresponding to a mode, for example, the result of the previous mode switch, the time since the coefficients of the filter have been updated, or other dynamically varying properties.

The above algorithm can be further extended so that the filter input vector X(n) gets conditioned before entering the filtering process, through additional steps, to modify its range or scale in order to optimize the predictive filtering process. Typically the DC or the magnitude offset contained in the original signal can be subtracted from the signal before entering into the filtering process. These additional steps may be referred to as "pre filtering process." The DC or the magnitude offset may be added to the filter's output signal during the post processing process.

Figure 7:
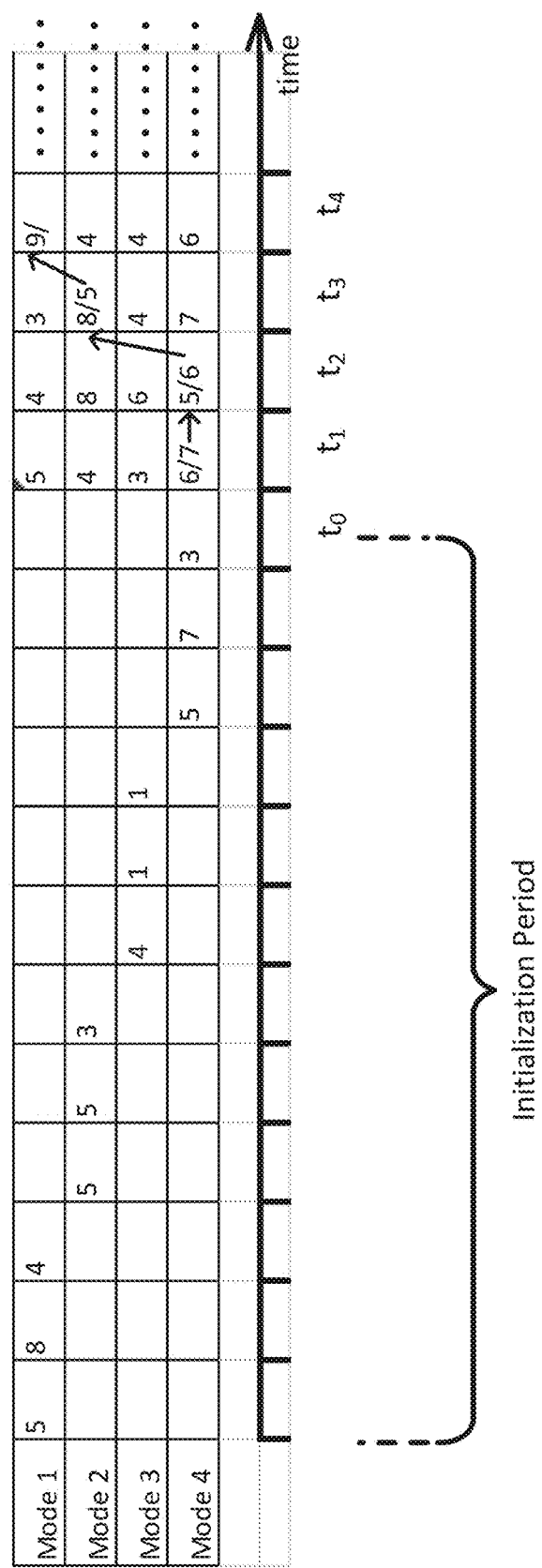
FIG. 7 illustrates an example of the modal cognitive diversity (MCD) procedure using the CQI prediction algorithm for a case of having four modes with the filter length of three.

FIG. 7 illustrates an example of the MCD procedure using the CQI prediction algorithm for a case of having four modes with the filter length of three. This example involves the prediction of one step forward as represented by Eq. (4a), and is explained here for illustrative purposes. The tick marks in the time line represent arrivals of pilot signals. The first 12 pilot signals are used to measure CQI values and corresponding coefficients of filter, which are stored for initialization. Fictitious numbers representing CQI values are inputted for mode 1, mode 2, mode 3 and mode 4 for illustrative purposes in this figure. At time t0, the CQI prediction algorithm calculates the predicted CQI, $\overline{CQI}$, for each mode based on the CQI values and coefficients measured and stored during the initialization period. The mode having the best predicted CQI is selected. In this example, mode 4 has the best predicted CQI of 6. At time t1, the instantaneous CQI is measured for mode 4, giving the value of 7 in this example. The measured CQI and corresponding coefficients are stored in the mode 4 memory section. The CQI prediction algorithm calculates the next predicted CQI, $\overline{CQI}$, for each mode based on the CQI values and coefficients during the last three time segments. The switching threshold, Δ, in Eq. (4) is predetermined to be 1.9 in this case. The instantaneous CQI for mode 4, which is measured to be 7, is compared against each of the predicted CQI values for the four modes. Since there is no mode giving a predicted CQI value that exceeds the instantaneous CQI of mode 4 by more than the threshold Δ=1.9, the selected mode remains the same, which is mode 4. At time t2, the instantaneous CQI is measured for mode 4, giving the value of 6 in this example. The measured CQI and corresponding coefficients are stored in the mode 4 memory section. The CQI prediction algorithm calculates the next predicted CQI, $\overline{CQI}$, for each mode based on the CQI values and coefficients during the last three time segments. The result shows that mode 2 gives the best predicted CQI of 8, which exceeds the instantaneous CQI of mode 4, which is 6, by more than the threshold Δ=1.9. Thus, mode 2 is selected. At time t3, the instantaneous CQI is measured for mode 2, giving the value of 5 in this example. The measured CQI and corresponding coefficients are stored in the mode 2 memory section. The CQI prediction algorithm calculates the next predicted CQI, $\overline{CQI}$, for each mode based on the CQI values and coefficients during the last three time segments. The result shows that mode 1 gives the best predicted CQI of 9, which exceeds the instantaneous CQI of mode 2, which is 5, by more than the threshold Δ=1.9. Thus, mode 1 is selected. The similar procedure is carried out at the subsequent time steps, predictively determining the mode that gives the best CQI during each time interval.

As explained in the above example, the memory section of each mode includes CQI values during the filter length, and continuously updated with measured or predicted values. Over a certain time period, the stored information may become obsolete, not reflecting the actual CQI variation for the mode, due, for example, to lack of convergence or stability of the algorithm. Accordingly, the memory may need to be refreshed by repeating the initialization procedure to measure and store new CQI values and coefficients. The filter length may be of the original length for the entire refresher, or less for a partial refresher. The refresher process may be configured to start when a certain predetermined criterion is met, for example, when the predicted CQI value becomes less than a certain predetermined value.

The training (initialization or refresher) periods for different modes can be adjusted to follow different schemes. The period may be fixed consecutive steps for each mode (as described in the above example of FIG. 7), or may be divided into several smaller periods which are alternated between different modes. For example, instead of 3 steps for mode 1 and then 3 steps for mode 2, it could be 2 steps for mode 1, 2 steps for mode 2, and then 1 step for mode 1 and 1 step for mode 2. Alternatively, the training period for a mode may be determined by a condition on the error function e(n) in Eq. (1), such that the training on each mode will last until a predetermined error threshold is reached.

The step size parameter, μ, in Eq. (1) is related to convergence of the algorithm, and may be adjusted to vary over time for each filter corresponding to a mode in order to reduce the training period and/or to optimize the prediction, for example. The parameter μ can be adjusted according to motion of the device (speed, acceleration, angle change, etc.) as well as use conditions (presence of a head, a hand, etc.) and multi-path environments (reflection, fading, shadowing, interference, etc.) to take into account the speed of variation of the channel relative to the device.

For real time constraints reasons, the algorithm can be implemented in such way that the different filters and their post filtering processes are independent of each other and run in parallel. In such a case, the outputs of the different filters and their post filtering processes are configured to synchronize at the decision stage level. The independent filters can have different parameters, such as different filter lengths M, step size parameters μ, numbers of future prediction steps k, thresholds Δ, and so on.

There are instances when the handset is experiencing unusual local movements, such as shaking, fast speed or a sudden change in motion or speed. In another instances, the handset may be sitting idle on a table surface. Sensors such as a proximity sensor, a motion sensor, a light sensor or a pressure may be used to detect speed, acceleration, angle change and other motion parameters. Global positioning system (GPS) data may also be used to determine the speed, acceleration, and direction of the mobile device. These motion parameters associated with the device movements may be detected and used to interrupt the MCD process to avoid unnecessary mode selection procedures. This is because the CQI may be changing so rapidly that it is meaningless to select the best modes for short time intervals individually, or not changing at all so that a new mode selection is not necessary. The MCD process may be resumed when the detected motion parameter falls within a certain nominal range, for example. Alternatively, without interrupting the MCD process, the various parameters such as the filter length M, the step size parameter μ, the number of future prediction steps k in the post filtering process, and the threshold Δ may be dynamically adjusted to optimize the process depending on information from a CPU, ASICs, sensors or other condition- or environment-detecting means.

Figure 8:
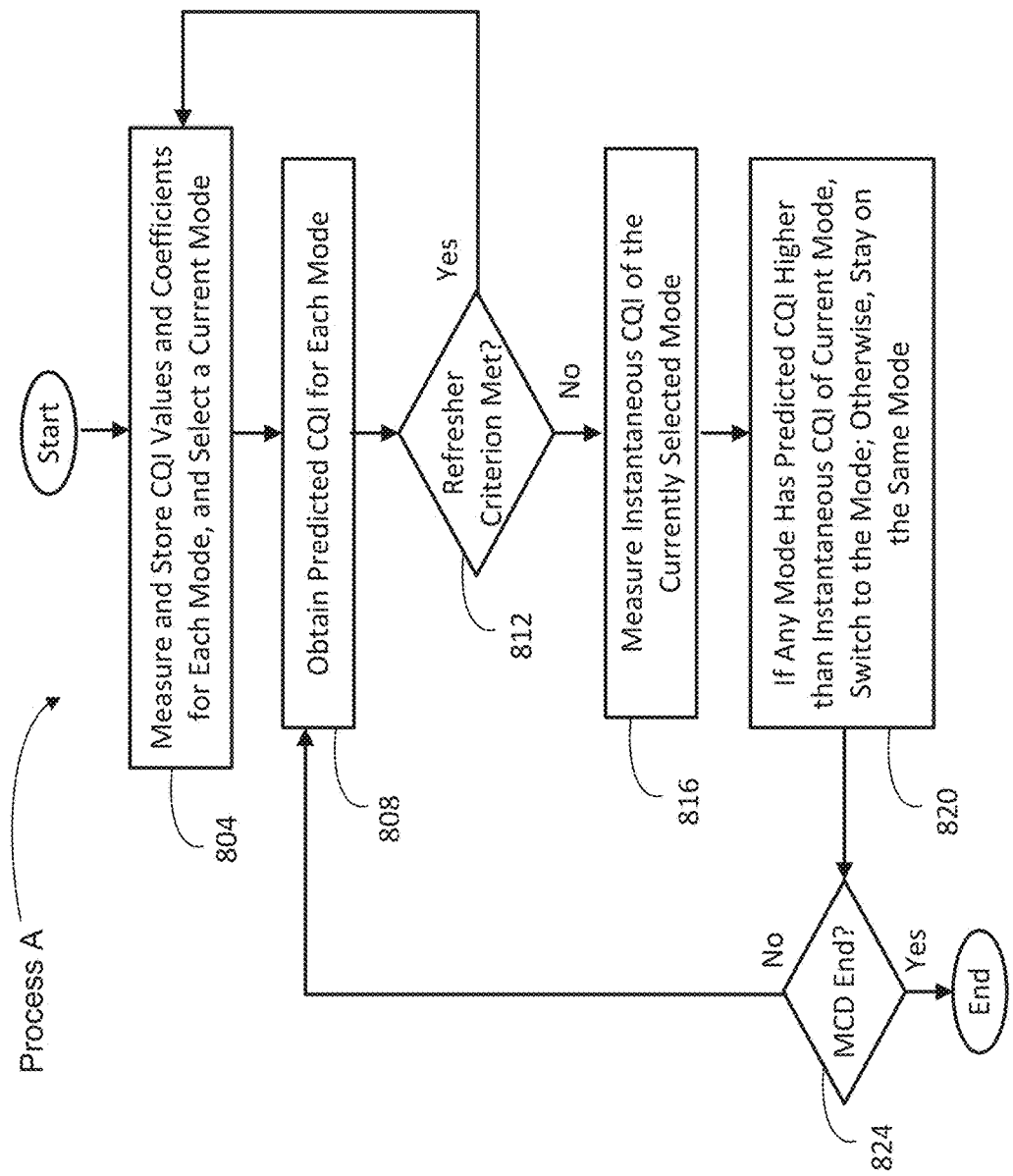
FIG. 8 is a flow chart illustrating a first example of the MCD process.
Figure 9:
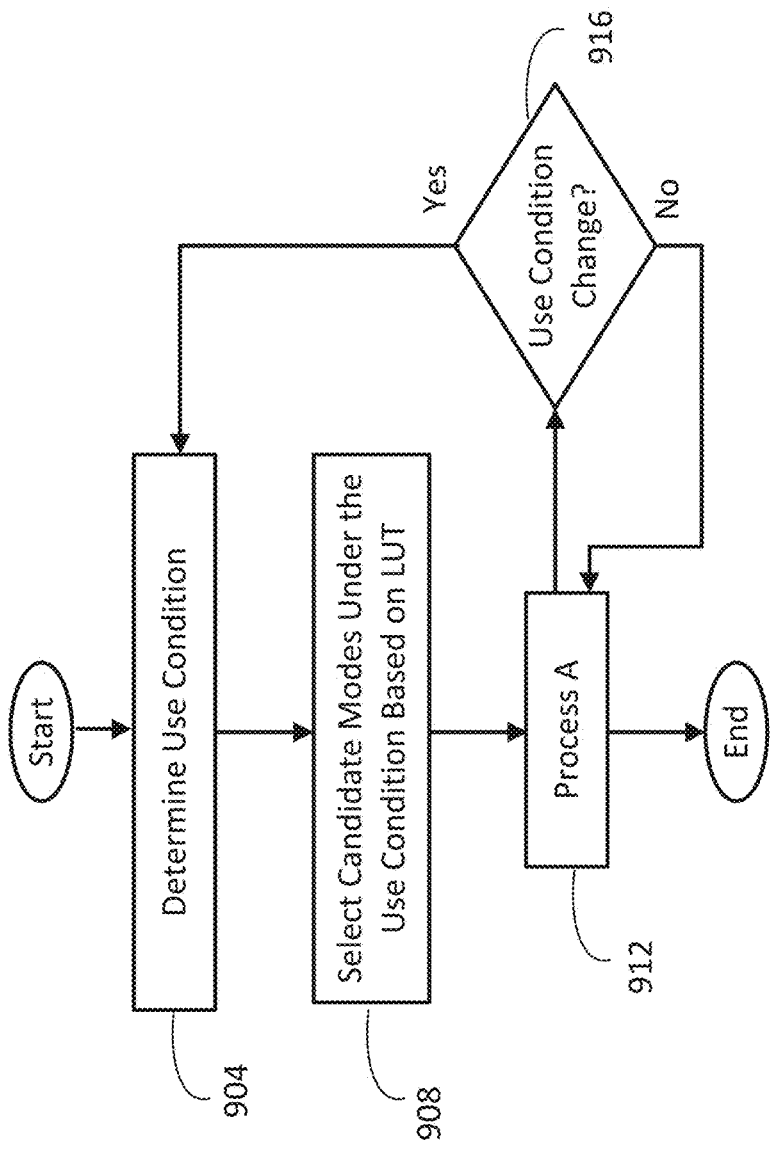
FIG. 9 is a flow chart illustrating a second example of the MCD process.
Figure 10:
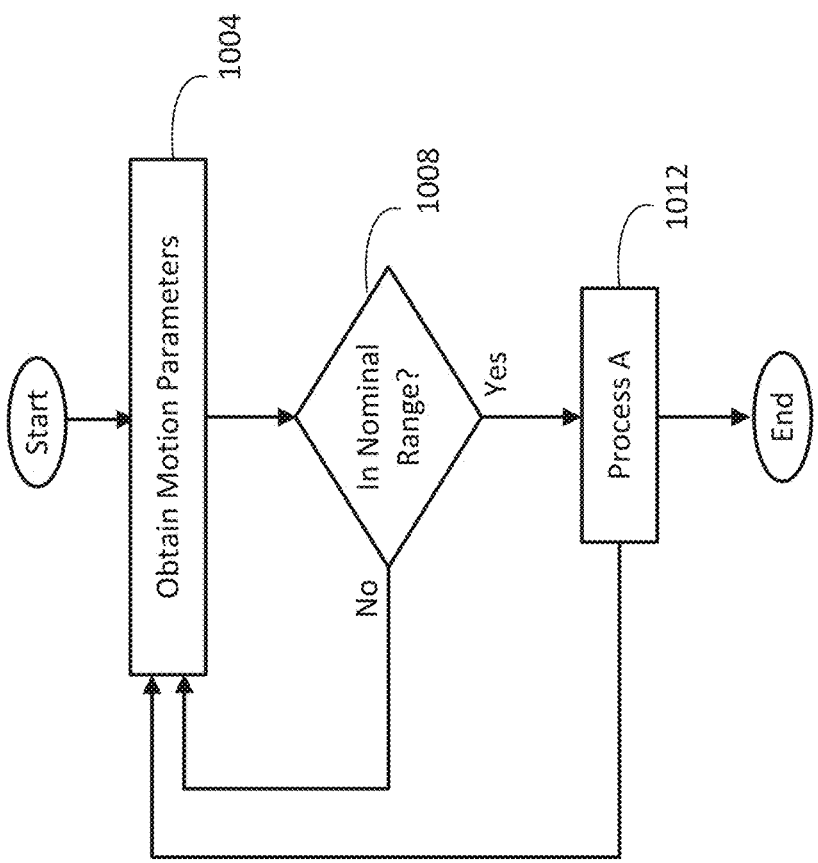
FIG. 10 is a flow chart illustrating a third example of the MCD process.

FIGS. 8, 9 and 10 are flow charts, each illustrating an example of the MCD process to dynamically select the optimal mode of a modal antenna for each time interval. FIG. 8 illustrates a first example of the MCD process, which is process A between the start and end steps. In step 804, CQI values and corresponding coefficients of filter for each mode are measured using the pilot signals and stored in the memory for initialization. These values for each mode are measured for the filter length period. An initial current mode is selected among the modes. Subsequent pilot signals are used for measurement throughout the process. In step 808, the predicted CQI, $\overline{CQI}$, for each mode is obtained using the CQI prediction algorithm based on the stored CQI values and coefficients during the last filter length. In step 812, it is determined if refreshing of the memory is needed based on a certain refresher criterion. If needed, the process goes back to step 804 to measure and store new CQI values and corresponding coefficients for each mode. The filter length for the measurement may be of the original length for the entire refresher, or less for a partial refresher. The refresher process may be optional and may be skipped if the original initial values provide overall convergence and stability with the algorithm. If the refresher is not needed, the process proceeds to step 816 to measure the instantaneous CQI of the currently selected mode. In step 820, if any other mode has the predicted CQI higher than the instantaneous CQI of the current mode, the current mode is switched to the mode that has the higher predicted CQI. A threshold for the CQI comparison may be predetermined such that the switch from one mode to another gives a meaningful, good enough CQI improvement. If the expected CQI improvement is less than the threshold, or the other modes provide the predicted CQI values lower than the instantaneous CQI of the current mode, the mode stays the same. The process of selecting the optimal mode based on the comparison between the instantaneous CQI of the current mode and the predicted CQI values of the other modes is repeated until the MCD process is determined to end at step 824 based on user inputs or control information.

FIG. 9 illustrates a second example of the MCD process. This example utilizes a LUT. In step 904, the use condition is determined based on information detected by one or more sensors, for example. The use conditions include positioning of a head and/or a hand of a user such as possible distances and angles with respect to the handset. Based on the use condition, candidate modes are selected according to the characterization data stored in the LUT. The MCD process such as the process A of FIG. 8 follows as in step 912 to select the optimal mode among the candidate modes. It is checked at certain times if the use condition has changed in step 916. If changed, the process goes back to step 904 to determine the new use condition. New candidate modes are selected in step 908 under the new use condition, and the process A is repeated to select the optimal mode among the new candidate modes in step 912.

FIG. 10 illustrates a third example of the MCD process. This process avoids unnecessary mode selection procedures when the device is experiencing unusual movements, such as shaking, fast speed, sudden change in speed, sitting idle and so on. These are the situations where the CQI may be changing so rapidly that it is meaningless to select the best modes for short time intervals individually, or not changing at all so that a new mode selection is not necessary. In step 1004, motion parameters are obtained to detect the motion of the device, such as speed, acceleration, direction, angle change and the like. Sensors in the device and/or the GPS system may be used for the motion detection. If the motion parameters indicate that the motion of the device is in a predetermined nominal range at step 1008, the process A follows in step 1012 to select the optimal mode for each time interval. If at least one of the motion parameters, such as speed, is out of the nominal range, the process A is not initiated. The process may be configured so that even during the process A, step 1004 may be taken to obtain motion parameters with certain time intervals to check if any change in motion has occurred. The process A continues when the motion parameters fall in the respective nominal ranges. If at least one of the motion parameters is out of the nominal range, the process A is stopped until all the motion parameters get back to respective nominal ranges.

Three examples of the MCD process are explained in the above. Variation examples include the combination of the second and the third examples to utilize the LUT for selecting candidate modes for time saving as well as to detect motion parameters to avoid unnecessary selection procedures when the device is experiencing unusual movements.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:

1. A communication system, comprising:
    a plurality of antennas, the plurality of antennas including at least one modal antenna, each of the at least one modal antenna including a radiating element positioned above a circuit board forming a volume of the antenna therebetween, and a parasitic element positioned adjacent to the radiating element, wherein each of the at least one modal antenna is configurable about a plurality of distinct modes upon varying a reactance associated with the parasitic element, wherein each of said modes corresponds to one of a plurality of radiation patterns associated with the modal antenna; and
    a processor coupled to the plurality of antennas and configured to select a mode among the plurality of modes to optimize signal quality for each time interval based on a channel quality indicator (CQI), the processor further configured to selectably vary the reactance of the parasitic element of each of the at least one modal antenna.

2. The communication system of claim 1, wherein during a time interval, the processor is configured to measure an instantaneous CQI of the selected mode, obtain a predicted CQI value of each mode, compare the instantaneous CQI of the selected mode to the predicted CQI values of the other modes, and if the predicted CQI value of one of the other modes is higher than the instantaneous CQI of the selected mode, select the one of the other modes to optimize the signal quality for a next time interval.

3. The communication system of claim 2, wherein the processor is configured to select the one of the other modes if the predicted CQI value of one of the other modes is higher than the instantaneous CQI of the selected mode by more than a predetermined threshold.

4. The communication system of claim 2, wherein the processor is configured to select the one of the other modes if a result of a post filtering process for one of the other modes is higher than the instantaneous CQI of the selected mode by more than a threshold determined for the time interval.

5. The communication system of claim 4, wherein the processor is configured to obtain one or more first parameters associated with motion of the communication system and to update one or more second parameters associated with the post filtering process based on the first parameters.

6. The communication system of claim 4, wherein the processor is configured to obtain one or more first parameters associated with motion of the communication system and to update one or more second parameters associated with the post filtering process and the threshold based on the first parameters.

7. The communication system of claim 1, further comprising:
    a lookup table associated with the processor, the lookup table including characterization data of each mode categorized by use conditions; and a section to detect a use condition, wherein the processor is configured to select two or more candidate modes that are likely to optimize the signal quality under the use condition and select a mode among the candidate modes to optimize the signal quality for each time interval based on the CQI.

8. The communication system of claim 1, wherein the processor is configured to obtain one or more parameters associated with motion of the communication system, and if the one or more parameters are in respective predetermined ranges, select a mode that optimizes the signal quality for each time interval based on the CQI.

9. The communication system of claim 1, wherein the processor is configured to obtain one or more first parameters associated with motion of the communication system and to update one or more second parameters associated with the selection based on the first parameters.

10. A method for implementing antenna diversity in a communication system, comprising:
    providing a plurality of antennas, the plurality of antennas including at least one modal antenna, each of the at least one modal antenna including a radiating element positioned above a circuit board forming a volume of the antenna therebetween, and a parasitic element positioned adjacent to the radiating element, wherein each of the at least one modal antenna is configurable about a plurality of distinct modes upon varying a reactance associated with the parasitic element, wherein each of said modes corresponds to one of a plurality of radiation patterns associated with the modal antenna; and
    selecting a mode among the plurality of modes to optimize signal quality for each time interval based on a channel quality indicator (CQI).

11. The method of claim 10, wherein the selecting during a time interval comprises:
    measuring an instantaneous CQI of the selected mode;
    obtaining a predicted CQI value of each mode;
    comparing the instantaneous CQI of the selected mode to the predicted CQI values of the other modes; and
    if the predicted CQI value of one of the other modes is higher than the instantaneous CQI of the selected mode, selecting the one of the other modes to optimize the signal quality for a next time interval.

12. The method of claim 11, wherein the selecting during a time interval comprises:
    if the predicted CQI value of one of the other modes is higher than the instantaneous CQI of the selected mode by more than a predetermined threshold, selecting the one of the other modes to optimize the signal quality for a next time interval.

13. The method of claim 12 wherein the selecting during a time interval further comprises:
    if each of the predicted CQI values of the other modes is lower than or equal to the instantaneous CQI of the selected mode plus the predetermined threshold, selecting the selected mode to stay on the same mode to optimize the signal quality for a next time interval.

14. The method of claim 10, wherein the selecting during a time interval comprises:
   measuring an instantaneous CQI of the selected mode;
   obtaining a metric value based on a plurality of predicted CQI values of each mode in a post filtering process;
   computing a threshold based on parameters associated with the post filtering process;
   comparing the instantaneous CQI of the selected mode to the metric values of the other modes; and
   if the metric value of one of the other modes is higher than the instantaneous CQI of the selected mode, selecting the one of the other modes to optimize the signal quality for a next time interval.

15. The method of claim 14, wherein the selecting during a time interval comprises:
   if the metric value of one of the other modes is higher than the instantaneous CQI of the selected mode by more than the threshold, selecting the one of the other modes to optimize the signal quality for a next time interval.

16. The method of claim 14, further comprising:
   obtaining one or more first parameters associated with motion of the communication system, wherein
   if at least one of the one or more first parameters is out of the predetermined range, the parameters associated with the post filtering process are adjusted.

17. The method of claim 10, further comprising:
   storing characterization data of each mode categorized by use conditions in a lookup table;
   detecting a use condition; and
   pre-selecting two or more candidate modes that are likely to optimize the signal quality under the use condition to select a mode among the candidate modes to optimizes the signal quality for each time interval based on the CQI.

18. The method of claim 10, further comprising:
   obtaining one or more parameters associated with motion of the communication system, wherein
   if the one or more parameters are in respective predetermined ranges, the selecting a mode that optimizes the signal quality for each time interval based on the CQI is carried out.

19. The method of claim 18, wherein
   if at least one of the one or more parameters is out of the predetermined range, the selecting is stopped until the one or more parameters are in the respective predetermined ranges.

20. The method of claim 10, wherein the selecting further comprises:
   storing CQI values and coefficients measured during an initialization period;
   updating the stored CQI values and coefficients during each time interval; and
   using the stored and updated CQI values and coefficients to obtain a predicted CQI value for each mode.

21. The method of claim 20, wherein the selecting further comprises:
   refreshing the stored and updated CQI values and coefficients when a refresher criterion is met.

* * * * *